Figure 1:
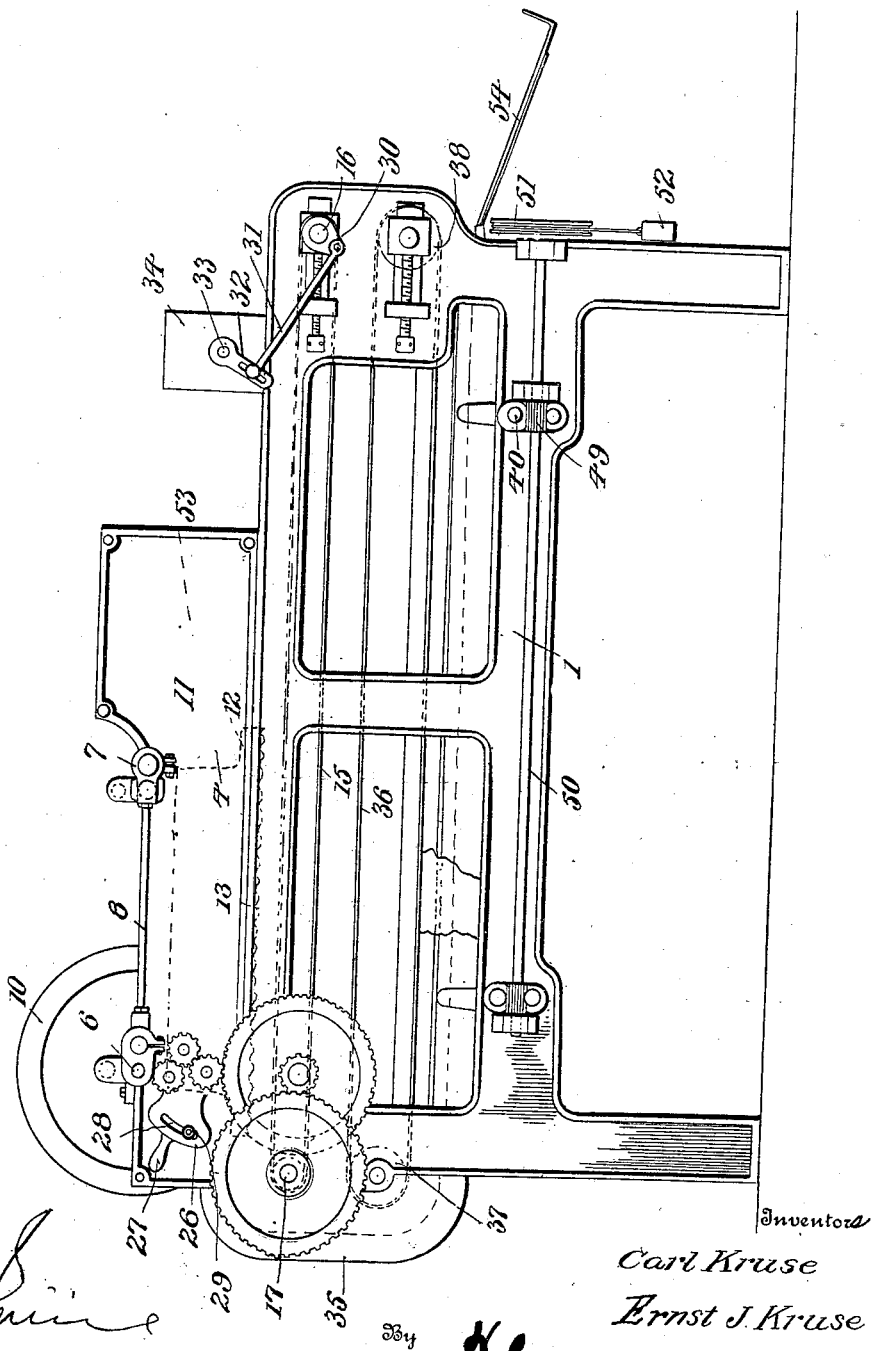

C. & E. J. KRUSE.
COMBINED BREAD KNEADING AND MOLDING MACHINE.
APPLICATION FILED JULY 8, 1908.

923,360.

Patented June 1, 1909.
3 SHEETS—SHEET 1.

Witnesses

Inventors
Carl Kruse
Ernst J. Kruse
By
Attorneys

C. & E. J. KRUSE.
COMBINED BREAD KNEADING AND MOLDING MACHINE.
APPLICATION FILED JULY 8, 1908.
923,360.
Patented June 1, 1909.
3 SHEETS—SHEET 2.
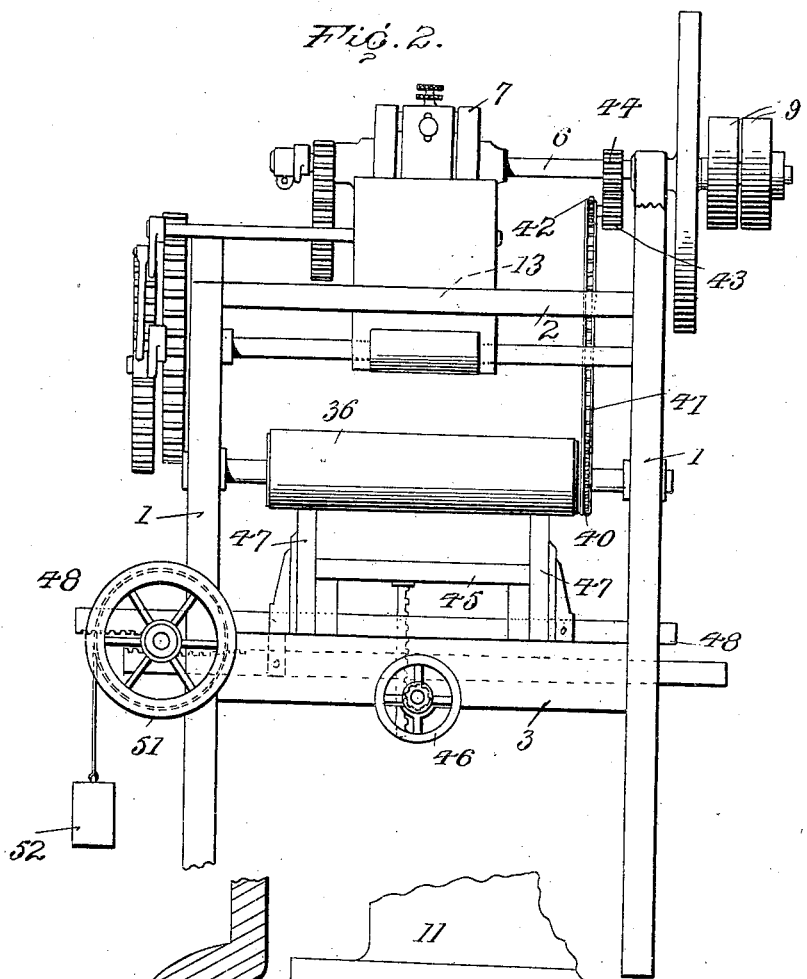
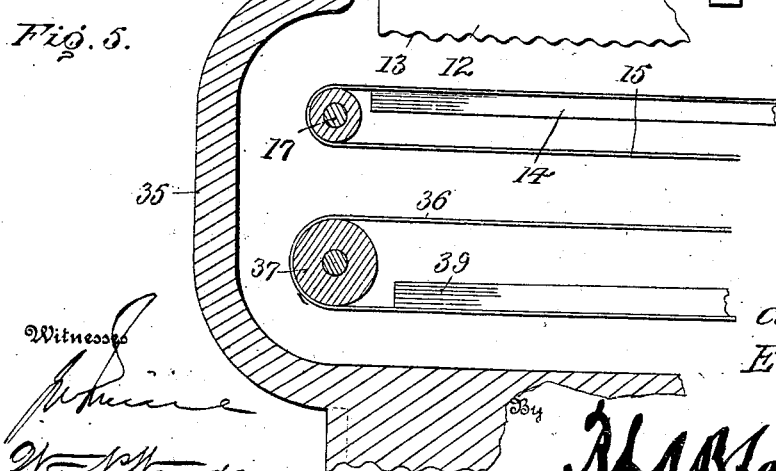
Inventors
Carl Kruse
Ernst J Kruse C. & E. J. KRUSE.
COMBINED BREAD KNEADING AND MOLDING MACHINE.
APPLICATION FILED JULY 8, 1908.
923,360.
Patented June 1, 1909.
3 SHEETS—SHEET 3.
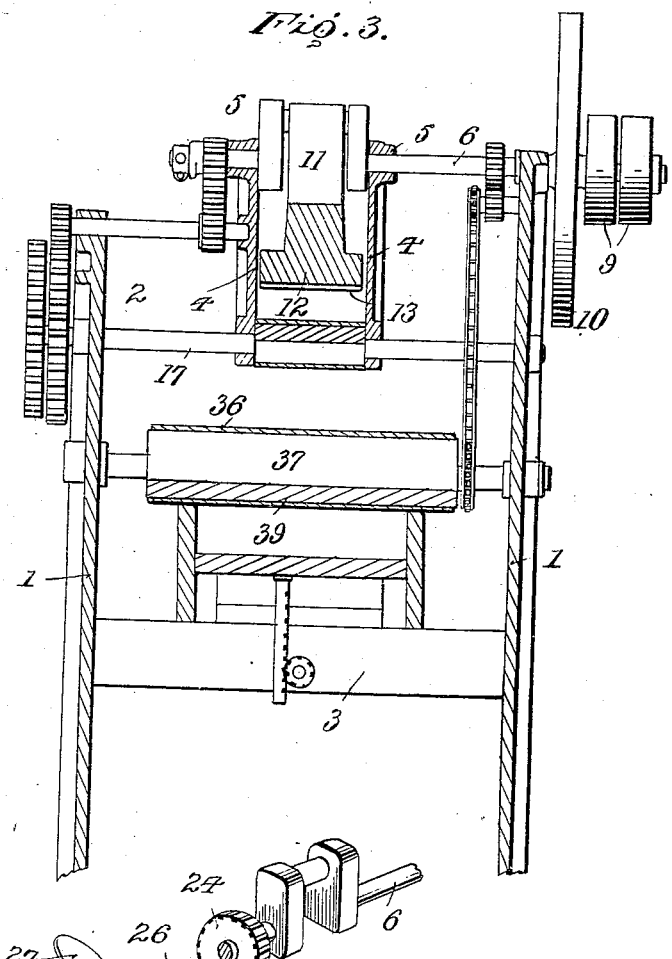
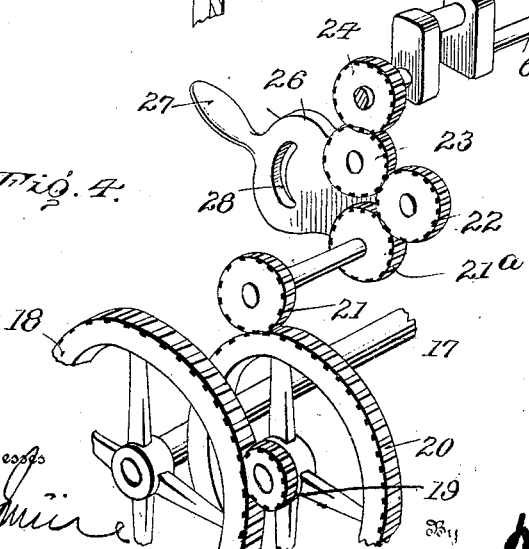

UNITED STATES PATENT OFFICE.

CARL KRUSE AND ERNST J. KRUSE, OF SEATTLE, WASHINGTON.

COMBINED BREAD KNEADING AND MOLDING MACHINE.

No. 923,360.     Specification of Letters Patent.     Patented June 1, 1909.

Application filed July 8, 1908. Serial No. 442,491.

*To all whom it may concern:*

Be it known that we, CARL KRUSE and ERNST J. KRUSE, citizens of the United States, residing at Seattle, in the county of King and State of Washington, have invented certain new and useful Improvements in Combined Bread Kneading and Molding Machines, of which the following is a specification.
The object of this invention is an improved construction of bread kneading and molding machine combined, which will be composed of comparatively few and simple parts, which will be durable and which will be efficient in operation to thoroughly knead the dough and retain the gases of fermentation therein in a finely distributed manner, and which will, immediately after the kneading operation, form the dough into a loaf and discharge it from the machine, the parts of the molding mechanism being so arranged that they may be easily adjusted to roll or form loaves of different sizes, both as to thickness and length.
With this and other objects in view as will more fully appear as the description proceeds, the invention consists in certain constructions and arrangements of the parts that we will hereinafter fully describe and claim.

For a full understanding of the invention, reference is to be had to the following description and accompanying drawings, in which:
Figure 1 is a side elevation of our improved bread kneading and molding machine. Fig. 2 is a rear end elevation thereof, parts being broken away or omitted. Fig. 3 is a transverse sectional view. Fig. 4 is a detail perspective view of the gearing for imparting movement to the kneading apron. Fig. 5 is a detail longitudinal section.

Corresponding and like parts are referred to in the following description and indicated in all the views of the drawings by the same reference characters.

The main supporting framework of our improved combined kneading and molding machine comprises side plates or bars 1 and upper and lower cross beams 2 and 3.

4 designates the side bars of the kneading portion of the machine. Upon the side bars are pillow blocks 5 forming bearings for two transversely extending crank shafts 6 that are both provided at one end with cranks 7 to which a connecting rod 8 is pivotally connected, so as to effect the simultaneous rotation of both shafts when one is turned. One of the shafts 6 is provided at one end with fast and loose pulleys 9 by which the machine may be operated from any suitable source of power, not shown, said shaft also carrying a fly wheel 10 to steady the motion. A longitudinally extending and vertically disposed supporting rib 11 is swung from the cranks of the two shafts 6 and to the lower edge of said supporting rib a kneading board 12 is secured, the lower face of said kneading board being transversely corrugated, as indicated at 13. By this construction and arrangement of kneading board and its operative suspending means, it will be seen that circular vibratory movement will be imparted to the board as the machine operates.

14 designates a bed plate which is secured in the supporting framework of the machine below the kneading board 13, being spaced therefrom as shown. An endless apron 15 is mounted to run around rollers carried by transverse shafts 16 and 17, the upper stretch of the apron passing over the upper surface of the bed plate 14 and being sustained thereby in proper level condition in the traverse of the apron. One of these roller-bearing shafts, the shaft 16 in the present instance, is mounted in adjustable bearings, so that the tension of the apron may be adjusted. In order to effect the movement of the apron 15, we mount a spur gear 18 on the shaft 17. This gear meshes with a pinion 19 movable with an idler gear 20. A pinion 21 meshes with the gear 20 and a corresponding pinion 21ª movable with the pinion 21, meshes with pinion 22, said last named pinion in turn meshing with a pinion 23 that is in meshing engagement with a pinion 24 on one end of the crank shaft 6. The pinions 21ª, 22 and 23 are carried by a plate 26 which is pivotally mounted, as shown, so that it may be shifted to carry the pinion 23 out of engagement with the pinion 24 and cause the engagement of the pinion 22 with said pinion 24 so as to reverse the movement of the apron 15 whenever desired. This has been found by us to be necessary, owing to the fact that some doughs must be treated longer than others. The plate 26 is provided with a handle 27 by which it may be manipulated and is formed with a curved slot 28 receiving a clamping nut 29 so as to hold the plate rigidly in position after it has been shifted.

In order to sift flour upon the upper stretch of the apron 15 before it receives the dough which is worked between it and the vibratory kneading board 12, we secure a crank 30 on one end of the shaft 16 and connect said crank by means of a pitman 31 with a crank 32 on the end of a sifting shaft 33 mounted in the flour discharge or sifting box 34, said box being supported in the framework in any suitable manner.

As the dough passes from the kneading portion of the machine after it has been properly kneaded and formed roughly into a lump or loaf, it is discharged into a chute or trough 35 which directs it into the molding portion of the mechanism mounted in the framework of the apparatus just underneath the kneading mechanism. The lumps or loaves are then successively engaged by the lower stretch of an endless belt 36 which is mounted to run around rollers 37 and 38 suitably journaled on the framework, the roller 38 being mounted in adjustable boxings so that the tension of the belt may be adjusted. A stiffening board 39 is mounted in the main framework just above the lower stretch of the belt 36 so as to maintain said stretch level during the operation of the machine. In order to drive the belt 36, a sprocket wheel 40 is mounted upon the shaft of the roller 37 and a sprocket chain 41 passes around said sprocket wheel and also around a similar, though relatively smaller, sprocket wheel 42 journaled on a stub shaft which also carries a spur pinion 43. A pinion 44 meshes with the pinion 43, the pinion 44 being mounted upon one of the crank shafts 6, so as to impart movement to the belt from the crank shafts.

The molding table which coacts with the belt 36 to roll the loaves over and over so as to properly form them into loaves of the desired thickness and length, comprises a bed plate 45 which is mounted underneath the lower stretch of the belt 36 and which is held in a vertically adjustable manner in the framework by means of lighter screws or similar mechanism actuated by a hand wheel 46 at the rear end of the machine. Said molding table also embodies side boards 47, the upper edges of which extend above the side edges of the bed plate 45 into close contact with the lower stretch of the belt 36. As stated at the outset of the specification, it is one of the objects of our invention to adapt the molding mechanism for producing loaves of different lengths, as well as thicknesses, and for this purpose we mount the side boards 47 in a laterally adjustable manner, so that they may coact with removable bed plates 45 of different widths. In this embodiment of the invention the side boards 47 are respectively secured to transversely extending rods 48 mounted to slide transversely in the framework, the rods being toothed at one end, as shown, and meshing with pinions 49 on a longitudinally extending shaft 50 journaled in bearings on one of the side bars on standards 1. The shaft 50 carries a grooved pulley or wheel 51 at one end and a weight 52 is suspended from a cord or cable secured to the periphery and the wheel 51 so as to exert a tension on the shaft 50 in a direction to move the side boards 47 toward each other so as to maintain them in close engagement with the side edges of the bed plate 45, no matter what the width of the latter may be. Hence it will be seen that in order to adjust the machine to loaves of greater or less lengths, it is only necessary to remove one bed plate 45 and substitute another, the side boards 47 automatically moving back into place against the edges of the bed plate after the latter has been inserted.

In the practical operation of our improved combined bread kneading and molding machine, the dough is fed to the machine by means of an inclined feed plate 53 and thence passes into engagement with the corrugated kneading board 12 and is kneaded thereby between the same and the traveling apron 15, which latter has been previously dusted with flour. As the dough is kneaded, it is at the same time roughly formed into lumps or loaves, which drop upon the chute 45 and are thus directed into the molding portion of the apparatus below the kneading mechanism. The loaves are then caught by the lower stretch of the traveling belt 36 and are rolled over and over between said stretch and its superposed stiffening board 39 and the subjacent bed plate 45 until loaves of the desired thickness and length are discharged from the rear end of the machine onto an inclined shelf or tray 54, as clearly illustrated in the drawings.

Having thus described the invention, what is claimed as new is:

1. In a bread kneading and molding machine, the combination of a supporting framework, a horizontally disposed endless apron mounted therein, means for imparting movement to said apron, a kneading board suspended in the framework above the upper stretch of the apron, means for imparting a circular vibratory movement to the kneading board, an endless belt mounted in the framework below the apron, means for imparting movement to said belt, a molding table mounted in the framework below the lower stretch of said belt, and means for directing the dough from the kneading board and apron into the space between the molding belt and table.

2. In a bread kneading and molding machine, the combination of a supporting framework, an endless apron mounted therein, a bed plate adapted to hold one stretch of said apron in a substantially level condition, a kneading board mounted in the framework and designed to coact with said stretch of the apron and bed plate to knead the dough, means for imparting a vibratory movement to said kneading board and a traveling movement to the apron, an endless belt mounted in the framework below the apron, a stiffening board coacting with one stretch of said belt to hold the same substantially level, means for imparting movement to said belt, a molding table coacting with one stretch of said belt to roll the dough, and a chute designed to direct the dough from the kneading board and apron to the belt and molding table.

3. In a machine of the character described, the combination of a supporting framework, a kneading board mounted therein, means for imparting a circular vibratory movement to said kneading board, an endless apron mounted in the framework below the kneading board, means for imparting movement to said apron, an endless belt mounted in the framework below the apron, means for imparting movement to said belt, a molding table mounted in the framework and coacting with one stretch of the belt to mold the loaves, and means for directing the loaves from the kneading board and apron to the belt and molding table.

4. In a machine of the character described, a molding table comprising a bed plate, laterally movable side boards adapted to abut against the side edges of the bed plate, transversely extending rods secured to the respective side boards, and means for automatically moving the said rods in a direction to push the side boards up against the side edges of the bed plate.

5. In a machine of the character described, a molding table comprising a bed plate, laterally movable side boards adapted to abut against the side edges of the bed plate, transversely extending rods connected to the respective side boards, the rods being formed at one end with teeth, a pinion meshing with said teeth, a shaft on which said pinion is secured, a wheel secured to said shaft, and a weighted cable secured to said wheel.

6. In a bread kneading and molding machine, the combination of a supporting framework, an apron mounted to travel in said framework, a kneading board suspended in the framework above the upper stretch of said apron, means for imparting a circular vibratory movement to the kneading board and a traveling movement to the apron, molding mechanism mounted in the framework underneath the apron, means for actuating said molding mechanism, and means for directing the dough from the kneading board and apron into the molding mechanism.

7. In a machine of the character described, the combination of a traveling apron, a kneading board adapted to coact with said apron, means for imparting movement to said kneading board, means for actuating said apron, and means for reversing the movement of said apron.

8. In a bread kneading and molding machine, the combination of a supporting framework, an apron mounted to travel in said framework, a kneading board suspended in the framework above the upper stretch of said apron, means for imparting movement to the kneading board and apron, molding mechanism mounted in the framework underneath the apron, means for actuating said molding mechanism, and means for directing the dough from the kneading board and apron into the molding mechanism.

In testimony whereof we affix our signatures in presence of two witnesses.

CARL KRUSE. [L. S.]
ERNST J. KRUSE. [L. S.]

Witnesses:
E. G. BUECKER,
P. DENNINGER.